ися
(12) United States Patent
Argillier et al.

(10) Patent No.: US 9,222,501 B2
(45) Date of Patent: Dec. 29, 2015

(54) DETACHABLE LINKING SYSTEM FOR TWO COMPONENTS

(75) Inventors: Fabien Argillier, Le Plessis Robinson (FR); François Durand, Magny les Hameaux (FR)

(73) Assignee: MBDA France, Paris (FR)

(*) Notice: Subject to any disclaimer, the term of this patent is extended or adjusted under 35 U.S.C. 154(b) by 0 days.

(21) Appl. No.: 13/125,009

(22) PCT Filed: Oct. 26, 2009

(86) PCT No.: PCT/FR2009/052047
§ 371 (c)(1),
(2), (4) Date: May 19, 2011

(87) PCT Pub. No.: WO2010/049630
PCT Pub. Date: May 6, 2010

(65) Prior Publication Data
US 2011/0217110 A1 Sep. 8, 2011

(30) Foreign Application Priority Data

Oct. 29, 2008 (FR) ...................................... 08 06011

(51) Int. Cl.
*F16D 1/00* (2006.01)
*F16B 21/08* (2006.01)
(Continued)

(52) U.S. Cl.
CPC ............. *F16B 21/086* (2013.01); *F16B 21/065* (2013.01); *F42B 15/36* (2013.01); *Y10T 403/24* (2015.01); *Y10T 403/32704* (2015.01); *Y10T 403/32803* (2015.01)

(58) Field of Classification Search
CPC ....... F42B 15/36; B64G 1/645; F16B 21/065; F16B 21/18; F16B 21/06; F16B 21/08; F16B 21/186
USPC ........ 403/16, 33, 129, 131, 132, 143, DIG. 3, 403/DIG. 4, DIG. 7, 2, 141; 102/377, 378
See application file for complete search history.

(56) References Cited

U.S. PATENT DOCUMENTS 876,912 A * 1/1908 Pike .............................. 403/143
1,091,449 A 3/1914 Westin
(Continued)

FOREIGN PATENT DOCUMENTS

DE 40 40 337 A1 6/1992
DE 41 17 351 A1 12/1992
(Continued)

OTHER PUBLICATIONS

International Search Report completed Feb. 16, 2010, mailed Feb. 23, 2010 from corresponding International Application No. PCT/FR2009/052047, filed Oct. 26, 2009 (3 pages).
(Continued)

*Primary Examiner* — Daniel P Stodola
*Assistant Examiner* — Matthew R McMahon
(74) *Attorney, Agent, or Firm* — Klein, O'Neill & Singh, LLP (57) ABSTRACT

The system of the present method, system, and device comprises a mechanism for linking components including: a rod having a widened and elastically deformable end; an axially movable needle; and a body surrounding the interacting ends of said rod and said needle; and a control device acting on said needle and capable of switching said widened elastically deformable end from an open position to a closed position.

20 Claims, 6 Drawing Sheets

(51) Int. Cl.
  *F16B 21/06* (2006.01)
  *F42B 15/36* (2006.01)

(56) References Cited

U.S. PATENT DOCUMENTS

| | | | | |
|---|---|---|---|---|
| 1,425,618 | A * | 8/1922 | Vodicka | 24/607 |
| 1,637,765 | A * | 8/1927 | Comstock | 403/143 |
| 2,509,081 | A | 5/1950 | Bluth | |
| 4,002,120 | A * | 1/1977 | Swales et al. | 102/378 |
| 4,069,864 | A * | 1/1978 | Novoryta et al. | 403/131 |
| 4,087,121 | A * | 5/1978 | Davis | 292/139 |
| 4,498,410 | A * | 2/1985 | Budge | 403/129 |
| 4,504,165 | A * | 3/1985 | Moeremans | 403/129 |
| 4,628,821 | A * | 12/1986 | Madderra et al. | 102/517 |
| 4,802,700 | A * | 2/1989 | Stevenson et al. | 403/143 |
| 4,929,135 | A * | 5/1990 | Delarue et al. | 411/354 |
| 3,014,744 | A | 12/1991 | Craik | |
| 5,080,521 | A * | 1/1992 | Quaile | 403/326 |
| 5,100,272 | A * | 3/1992 | Jadoul et al. | 411/45 |
| 5,161,838 | A * | 11/1992 | Ely et al. | 292/327 |
| 5,439,310 | A * | 8/1995 | Evenson et al. | 403/321 |
| 5,957,612 | A * | 9/1999 | Bradley | 403/2 |
| 6,126,115 | A * | 10/2000 | Carrier et al. | 244/173.3 |
| 6,146,049 | A * | 11/2000 | Faris | 403/326 |
| 6,338,589 | B1 * | 1/2002 | Kincaid et al. | 403/131 |
| 6,557,475 | B1 * | 5/2003 | Nygren et al. | 102/377 |
| 6,758,142 | B1 * | 7/2004 | Seaquist | 102/377 |
| 6,869,365 | B2 * | 3/2005 | Turbant et al. | 403/DIG. 7 |
| 6,925,939 | B2 * | 8/2005 | Cleveland | 102/378 |
| 6,928,931 | B1 * | 8/2005 | Biserød | 102/377 |
| 7,217,059 | B1 * | 5/2007 | Rudduck | 403/324 |
| 7,927,036 | B2 * | 4/2011 | Reasoner | 403/341 |
| 2005/0002730 | A1 * | 1/2005 | Hsieh | 403/286 |
| 2008/0253831 | A1 * | 10/2008 | Lai | 403/109.1 |

FOREIGN PATENT DOCUMENTS

| | | |
|---|---|---|
| EP | 0 467 295 A | 1/1992 |
| GB | 1 534 301 A | 11/1978 |
| WO | WO2010/049630 A1 | 5/2010 |

OTHER PUBLICATIONS

International Written Opinion completed Feb. 16, 2010, mailed Feb. 23, 2010 from corresponding International Application No. PCT/FR2009/052047, filed Oct. 26, 2009 (7 pages).

* cited by examiner

DETACHABLE LINKING SYSTEM FOR TWO COMPONENTS

CROSS-REFERENCE TO RELATED APPLICATION(S)

This is a national phase application under 35 U.S.C. §371 of PCT Application No. PCT/FR2009/052047, filed Oct. 26, 2009, which claims the benefit of French Application No. 08/06011, filed Oct. 29, 2008, the contents of which are expressly incorporated herein by reference.

FIELD OF ART

The present apparatus and system relate to a detachable linking system for two components or similar, intended for ensuring holding in position components one with respect to the other and subsequently authorizing, at a given time, their detachment by a relative movement generated by said system.

BACKGROUND

The term "component" is to be understood in the broad sense thereof and can mean any element, part, device, assembly, sub-assembly, etc. able to be assembled to another identical component or not through said system of the present method, system, and device, up to a given time when it is wanted to detach them.

The detachable linking system can thus find applications in a large number of technical fields.

For example, in a preferred, although not exclusive, application, the system can be integrated into an ammunition including a vector, such as a missile. Indeed, it is known that some parts of the ammunition are detached one from the other upon the ignition and during the trajectory. This is more particularly the case between the base or the bottom of the ammunition and the system for accelerating or propelling the missile linked between them by specific assemblies carrying, in addition to particular equipment, the detachable linking systems being angularly distributed around an internal annular space provided between the base and the acceleration system.

The usually used detachable linking systems generally comprise a linking mechanism between the two detachable components of the assembly, one being stationary, for example a plate, linked to the base, the other one movable, for example a floating support, linked to the acceleration system, and a device for controlling the linking mechanism so as to cause its motion and the detachment of the components.

Such systems are currently of two types.

In the first type, the linking mechanism is a ball-ended spindle, held on the movable support through screwing and having the balls radially projecting at the end of the spindle through the action of a movable central axis of the spindle, being inserted in an abutment inserted on the stationary plate. Upon the operation of the control device, being linked to the movable axis of the spindle via a ring, said axis slides with respect to the spindle and makes grooves arranged on it match with the projecting balls that retract then into the grooves and disconnect the spindle from the abutment integral with the stationary plate. The two components of the base and of the acceleration system are then released and detached one from the other.

Such a system assembly prohibits any angular movement. Indeed, the drawback of an angular shift is to lose contact with all the balls, which may lead to a concentration of efforts on a restricted and too low number of balls, with, in addition, a risk of matting. Furthermore, using several balls has the drawback of only offering one single generator per ball for any contact. Furthermore, crimping the axis with the ring has is of a low dimension, thus restricting the tensile effort for decoupling.

In the second type, the linking mechanism of the system is a breaking one and comprises an element to be broken under the action of the control device driving the mechanism.

In a first case, the element to be broken such as an axis is arranged perpendicular to the tensile effort generated by the device and is supported at the ends thereof by a yoke fastened to the plate and in the centre thereof by a brace being fastened to the floating support and connected to the control device. Breaking occurs at two places of the axis, through shearing.

In a second case, the axis to be broken is arranged parallel and coaxial to the tensile effort being connected at its ends to the plate and to the support.

Breaking is due to the axis being elongated through contraction of the section. The breaking moment is hardly under control.

The breaking effort, through shearing or elongation, is the major drawback of these two assemblies. Furthermore, the uncertainty of the breaking moment is detrimental to a detachment simultaneity, with a risk to cause jamming in the case of an assembly with several detachable linking systems.

Moreover, it is already known from document U.S. Pat. No. 3,014,744 a detachable linking system for two components, comprising a linking mechanism for said components and a control device for said linking mechanism so as to cause said components to be detached.

said linking mechanism being of the elastic deformation type and comprising, according to a longitudinal axis, at least:

one rod having a widened end being longitudinally slit and elastically deformable, and fastened, at its other end, to one of said components:

axially movable needle having an end being introduced in said widened end of the rod for holding it in an open position and the other end being connected to said control device; and axial hole body, fastened to the other component and surrounding said cooperating ends of said rod and of said needle, being axially linked to the latter and comprising, within said hole, an annular axial abutment against which said widened end of said rod is applied; and said control device being of the axial shift type, according to said longitudinal axis, and acting on said needle of the linking mechanism for moving it away from said widened end of the rod and, through the action of said abutment of the body linked to said shifted needle, for having said elastically deformable widened end switching from its open position to a closed position and enabling the relative crossing of said rod through said abutment of the body.

SUMMARY

The present method, system, and device aim at remedying the drawbacks of the first mentioned systems and relates to an improvement of the detachable linking system of document U.S. Pat. No. 3,014,744 enabling, more particularly, to hold in place the different elements mutually linked, including a possible control for overcoming the manufacturing tolerances, and a detachment during the relative movement at a given selected time, with a minimum effort.

To this end, the detachable linking system for two components of the last mentioned type is remarkable in that said needle is held axially in position with respect to said rod by a deformable ring carried by a component clamping member on said body and applying against an external annular edge of said needle.

Thus, according to the present method, system, and device, the combination is used of the elasticity of the widened end of the rod and of the axial shift of the needle moved by the control device for, on the one hand, linking the two components and, on the other hand, detach them, without any part being broken and with a relatively low detachment effort, as a function of the elasticity of the widened end for switching from its initial open position to its closed position and anyway lower than that required for breaking the prior mechanism. The completely mechanical manufacturing reliability is also to be noticed in such a linking mechanism.

Advantageously, said widened end of said rod has the shape of a longitudinally slit spherical head. And said axial abutment of the body then defines a spherical annular bearing complementary to the spherical head.

Thus, a slight angular clearance is made possible, enabling to absorb manufacturing tolerances from the parts constituting the mechanism and from the associated assembly, and to facilitate the positioning of the system. The contact surface between the spherical head and the axial abutment remains identical as well in every tolerated angular position, contrarily to the ball spindle system. And the contact of the spherical head with the bearing of the abutment is then of the surface type, ensuring a better operation and positioning of the mechanism, instead of being linear according to a generator for each ball of the spindle.

In a preferred embodiment, said spherical head comprises at least two slits arranged in perpendicular longitudinal planes separating said spherical head into four elastically deformable identical quarters, at the centre of which the corresponding end of said needle can be introduced so as to hold it in an initial open position. In order to achieve a much larger elasticity, said slits could extend into the rod, beyond said spherical head.

In another embodiment, said widened end of said rod has a longitudinally slit conical shape.

In particular, said axial abutment is arranged on an annular member mounted around said rod and inserted through screwing on said body. And fastening said rod to the corresponding component preferably occurs through screwing, the end opposed to the widened one being threaded and crossing a hole provided in said component, and a clamping nut providing the fastening of said rod.

Thus, screwing the nut on the rod enables to hold the needle in place through pinching its end by the elastically deformable widened end, pressing against the engaged one of the needle. Furthermore, thanks to the threaded end of the rod, the system can be set according to the distance separating the plate and the floating support of each assembly, which distance can vary as a function of plays and defaults resulting from manufacturing and said relevant assemblies. All plays according to the axis of each system are thereby compensated and, as a result, detachment of the different linking systems provided on the assemblies will occur simultaneously. If there should be a slight tilt, the angular clearance would absorb it.

Furthermore, it should be noticed that said needle is not only pinched by the elastically deformable spherical head, but it is still held axially in position with respect to said rod by the deformable ring carried by the clamping member of the component on said body and applying against an external annular edge of said needle. Thus, should vibrations or the like occur, the holding ring ensures any possible movement and prevent any inopportune unlocking at rest between the needle and the rod.

Moreover, fastening said rod to the corresponding component preferably occurs through screwing, the end opposed to the widened one being threaded and crossing a hole provided in said component, and a clamping nut providing the fastening of said rod.

Moreover, linking said needle to said control device preferably comprises a fastening nut receiving the threaded end of the needle opposite the one introduced in said rod, and a screw of said device.

BRIEF DESCRIPTION OF THE FIGURES

The FIGS. of the appended drawing will better explain how the present method, system, and device can be implemented. In these FIGS., like reference numerals relate to like components

DETAILED DESCRIPTION

Figure 1:
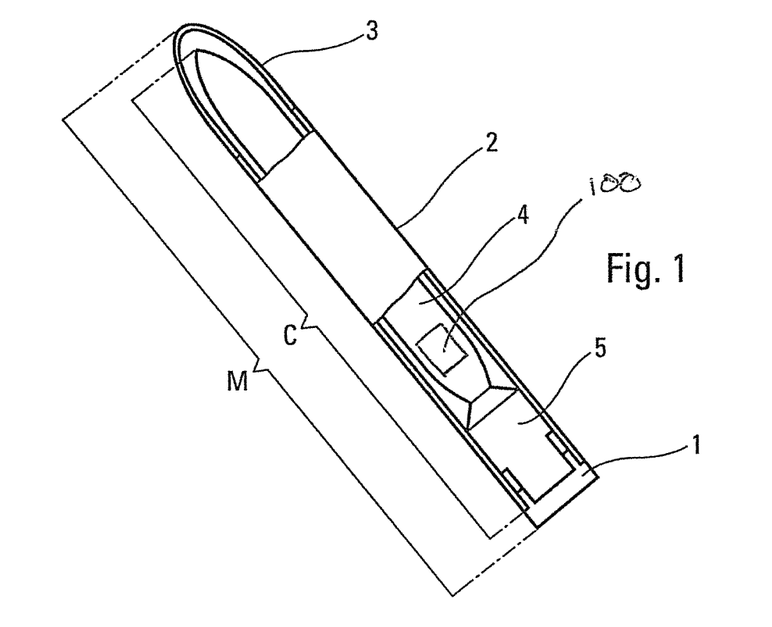
FIG. 1 shows an ammunition and the different constitutive parts thereof.

The ammunition M shown on FIG. 1 usually comprises several assembled cylindrical parts (or stages), herein referred to as base or rear part 1, tube or central part 2 and cover or front part 3, inside which a composite C is located comprising a missile 4 (guidance system 100 and military load not shown) linked to the acceleration and rocking system 5 and that, upon the ignition of the composite and during the flight trajectory, are to become detached.

Figure 2:
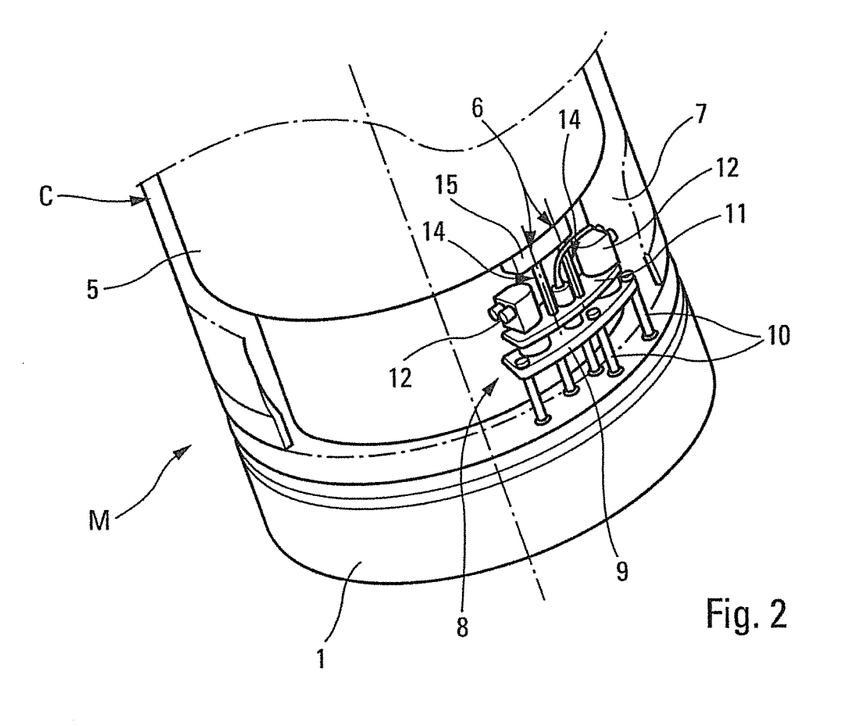
FIG. 2 shows, in a schematic partial perspective view, detachable linking systems of the present method, system, and device associating two components of the ammunition that are to be detached.

To this end, in the illustrated and enlarged embodiment of FIG. 2, the assembly between the base 1 and the acceleration and rocking system 5 of the composite C occurs via detachable linking systems 6 according to the present method, system, and device and being, in such an example, in the number of two. To this end, within the internal annular space 7 being available, between the base and the acceleration system, a specific assembly 8 is provided, comprising two parallel plates, the lower one 9 fastened to the base 1 via braces 10 or similar and the other upper one 11, referred to as a floating support, connected to the acceleration system 5 through linking systems 6 of the present method, system, and device, as described hereinafter. On such assemblies, particular equipment parts 12 are provided, arranged between said plate 9 and said floating support 11 and also carried on the latter.

Figure 3:
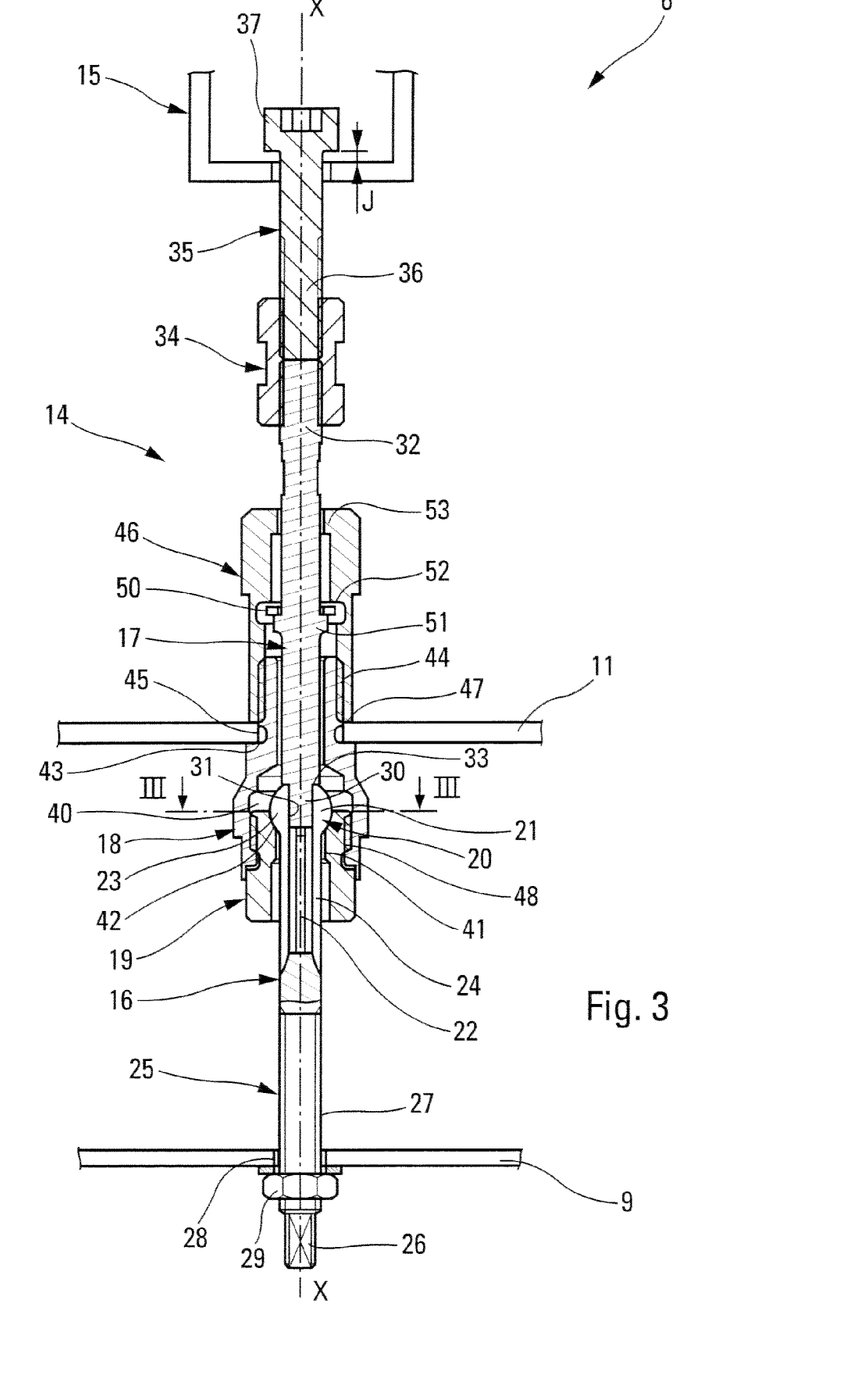
FIGS. 3, 4, 5 and 6 are longitudinal sectional views of said linking system of the present method, system, and device according to an exemplary embodiment and shown in its different operating phases from linking of the components, FIG. 3, until they are completely detached, FIG. 6.

As shown on FIG. 3, the shown detachable linking system 6 comprises a linking mechanism 14 between the stationary plate 9, connected to the base, and the movable support 11, connected to the acceleration system and, thus, to the composite C, and a control device 15 of the linking mechanism 14 for leading to the detachment of the base 1 (plate) from the acceleration system 5 (support) of the composite. Naturally, the control devices 15 associated with the assemblies 8 simultaneously act on the linking mechanisms 14 that such assemblies comprise.

In the illustrated exemplary embodiment, the linking mechanism 14 comprises, along a longitudinal axis X-X parallel to the axis of the composite, an elastically deformable rod 16 connected to the plate 9, a sliding needle 17 connected to the control device 15 and cooperating with the rod 16, an annular cylindrical body 18 fastened to the floating support 11 and provided with an annular axial abutment member 19 for the elastically deformable rod.

Figures 7, 7A:
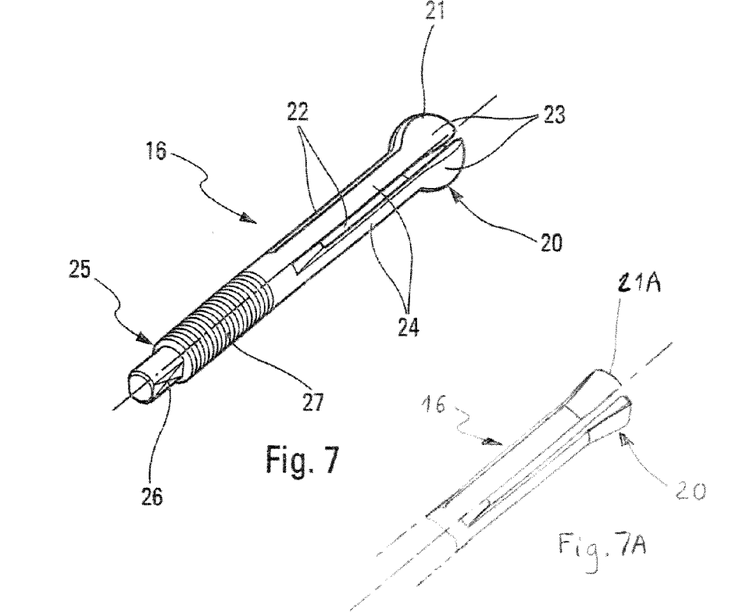
FIGS. 7 and 7A are perspective views of embodiments of the elastically deformable rod of the linking mechanism.

In particular, the rod 16 shown on FIGS. 3 and 7 has an elastically deformable widened end 20 having, in this preferred example, the shape of a spherical head 21 with a diameter larger than that of the rod and having two through slits 22 arranged in perpendicular longitudinal planes for thereby defining four identical quarters or petals 23. Thus, for providing some elasticity of the end 20, the slits 22 extend into the rod 16 beyond the spherical head 21 until approximately the third, or even half, of the length of the rod, thereby forming elastically deformable spherical head elongated fingers 24. The slits 22 arranged in the spherical head 21 allow the quarters or fingers to come closer one to the other in the direction of the axis X-X and, thus, to reduce the initial diameter of the spherical head, occupying an open position on FIGS. 3 and 7, with a lesser effort, as will be set forth later on. FIG. 7A shows an alternative embodiment of the rod 16, with a widened end 20 having a conical shape 21A. The opposite end 25 of the rod 16 has a threaded part 27 crossing a hole 28 provided in the plate and receiving a clamping nut 29 fastening the rod 16 to the plate according to the axis X-X. For holding the rod (in rotation) upon clamping the nut with a wrench or similar, the threaded part 27 ends with a cylindrical land nosepiece 26. Of course, before being assembled to the plate, the body 18 and the abutment member 19 are arranged around the rod 16.

As to the needle 17, it has an elongated cylindrical shape, with one end 30 being smooth and introduced through fitting into the cylindrical internal channel 31 defined by the spherical head 21 deformable elongated fingers 24 of the end of the rod 16. The introduction distance of the smooth end 30 is substantially equal to the spherical head 21, so that the latter is held in an initial open position, and this distance is defined by an external shoulder 33 of the smooth end 30, axially abutting against the spherical head widened end 20 of the rod. Thus, when the smooth end 30 of the needle is inserted into the deformable spherical head 21 resting on the annular axial abutment member 19, as seen later on, the plate 9 and the floating support 11 of the assembly 8 are locked to each other.

The opposite end 32 of the needle is threaded so as to engage, through screwing, into a fastening nut 34 connecting the control device 15 to the needle 17 via a screw 35, having its threaded rod 36 cooperating with the nut so as to abut against the threaded end 32 of the needle. Thus, the needle 17 and the screw 35 make up a whole, through the linking nut 34. It could be furthermore noticed, on FIG. 3, that there is an axial play J between the control device 15 and the head 37 of the screw 35 so as to absorb some longitudinal movements due to the external environment of the assembly.

The cylindrical body 18 comprises art axial hole 40 being crossed by the cooperating ends, respectively with a spherical head 21 of the rod and the smooth one 30 of the needle. Such a cylindrical body 18 is centred in the floating support 11 being fastened on it, as will be seen later on, and carries, according to the axis X-X, the annular axial abutment member 19.

In particular, such an annular member 19 has its axial hole 41 extending that of the body, for the rod crossing, which hole 41 ends on the needle side with a bearing or a spherical cup 42 against which the spherical head 21 of the rod applies. Of course, the dimensions of the bearing 42 and of the head 21 match with each other. Thus, the contact between the abutment member 19 and the elastically deformable rod 16 occurs via an annular spherical surface portion authorizing for a relative angular clearance of the rod 16 connected to the plate 9 with respect to the body 18 connected to the floating support 11 in all directions like a knee hinge. It is thus understood that clamping the nut 29 of the rod 16 on the plates tends to draw the rod against the plate and thus to press the elastically deformable fingers 24 against the spherical bearing 42 and accordingly to pinch the smooth end 30 of the needle.

Such an annular axial abutment member 19 is mounted through a screwing link 48 in the axial hole 40 of the body 18 and the latter has an external annular shoulder 43 forming a resting plane against which the floating support 11 applies so that the threaded end 44 of the body, coming from the annular shoulder 43 and opposite that receiving the abutment member 19, crossing a crossing hole 45 provided in the support 11 and emerging above the latter.

A retaining nut 46 is then screwed on the threaded end 44 of the body and applies via its transversal edge 47 on the support 11, pinching it and immobilizing it against the body.

Furthermore, when the systems 6 are used in severe environments for example with strong vibrations, each linking mechanism 14 could comprise a ring 50 for holding the needle 17 in axial position with respect to the rod 16 despite its smooth end 30 being pinched by the elastically deformable fingers 24. To this end, on the needle, an external annular shoulder 51 is provided, on which the ring rests, being in turn close, on the other side, to an internal annular shoulder 52 arranged inside the retaining nut 46. Such a ring 50 is advantageously deformable and prevents the needle 17 from axially moving back, preventing any inopportune locking before the missile is launched.

As to the control device 15 of the system 6, it moves axially and could be, for example, a driver or similar associated with the movement of the system 5.

Upon the missile being ignited, the operation of the detachable linking system according to the present method, system, and device occurs as follows.

First of all, in the above mentioned application, the different linking systems 6 provided on the specific assemblies 8 connecting the base 1 to the acceleration system 5 of the missile are all in the same position and set appropriately. Namely, as shown on FIGS. 3 and 3A, each needle 17 of the linking mechanisms 14 is implanted into the spherical head 21 in abutment against the member 19 and thereby prevents any closer shift of the spherical quarters of the head, locking mechanically the rod 16 fastened to the plate 9 to the remainder of the mechanism connected to the floating support 11 under the action of the elastic fingers 24 in an open position against the spherical bearing 42 of the annular axial abutment member 19. The assemblies are thereby locked.

Figure 4:
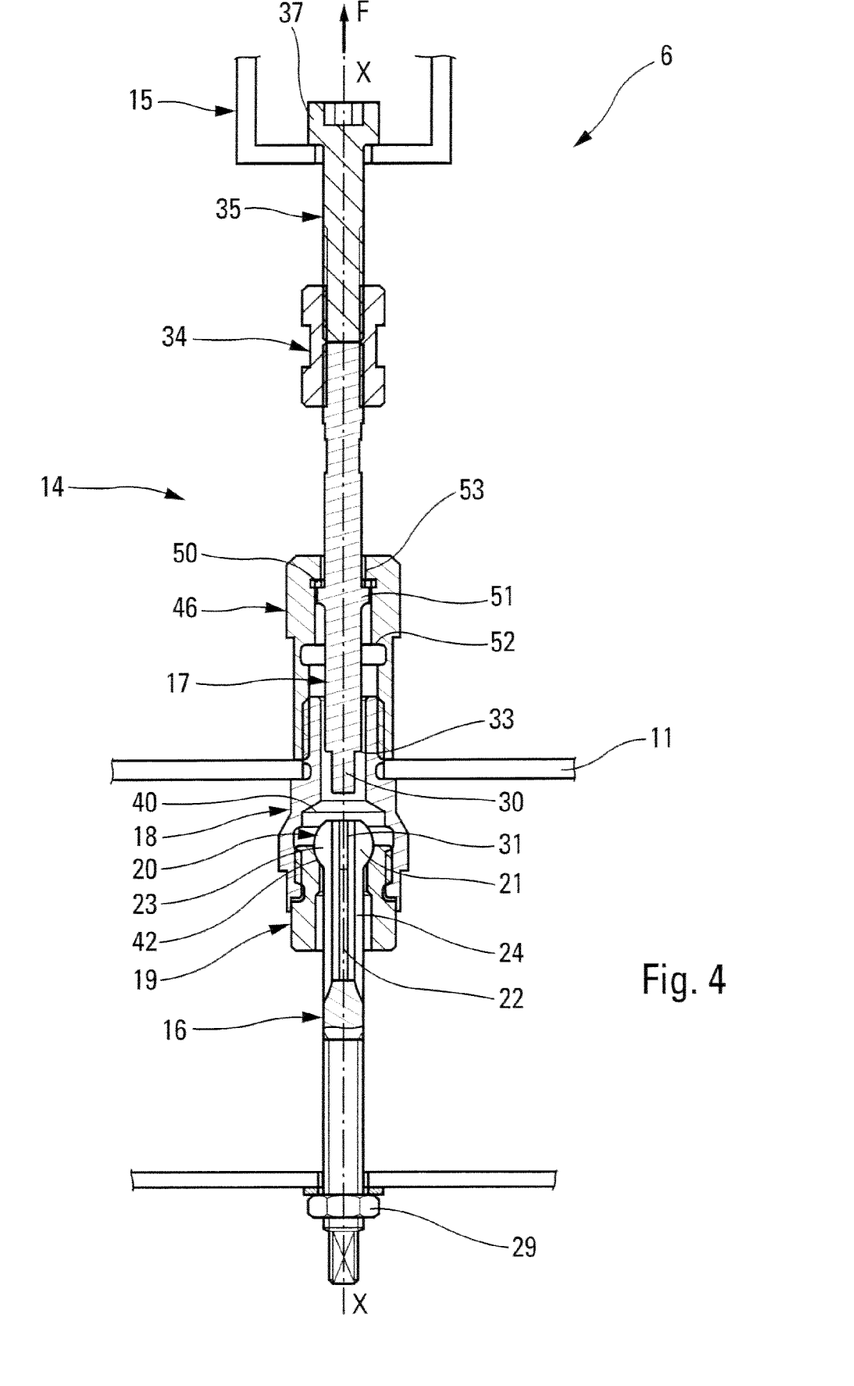

As now shown on FIG. 4, when the control device 15 starts its axial shift or its translation according to the arrow F of the axis X-X, it first neutralizes the play J present between the latter and the head 37 of the linking screw 35 with the mechanism, that is the needle, being required for absorbing possible longitudinal axial movements, caused by the external environment.

Continuing its axial shift according to the arrow F, the control device 45, via the screw 35, draws the needle, resulting in, on the one hand, the holding ring 50 becoming deformed which, under the action of the tensile effort caused by the axial shift of the device according to the axis X-X, retracts from the annular shoulder 52 of the nut 46 and, on the other hand, the smooth end 30 of the needle of the defined central channel 31 for the quarters 23 of the elastically deformable spherical head 21 of the rod 16 moving hack. The fingers 24 always occupy their initial open position, but are no longer locked in such a position by the needle as shown on FIG. 4. Sliding of the needle 17 according to the arrow F continues until its external annular shoulder 51, driving the ring 50, becomes contacted by the latter, with the transversal bottom 53 of the retaining nut 46.

The systems 6 are then locked, as the spherical heads 21 are simply carried by the abutment members 19, but are not detached.

As a result of the control device 15 being driven, the needle 17 continues to slide according to the arrow F along the axis X-X and drives with it, via the axial link between its external annular shoulder 51 and the transversal bottom 53 of the nut, the assembly comprising the nut 46, the floating support 11, the cylindrical body 18 and the axial abutment member 19 being integral with each other.

Figures 3A, 5A:
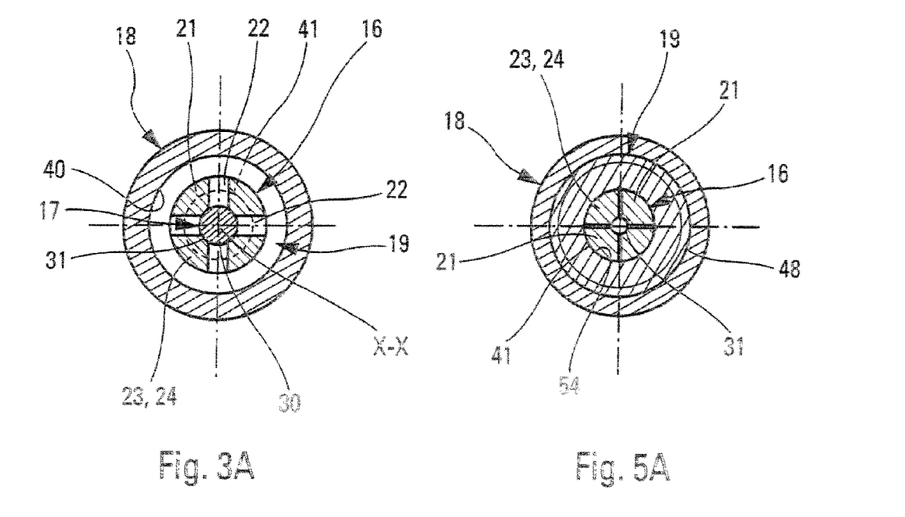
FIGS. 3A and 5A are enlarged cross sections of the respective open and closed positions of said elastically deformable slit spherical head, taken across the planes and V-V of FIGS. 3 and 5.
Figure 5:
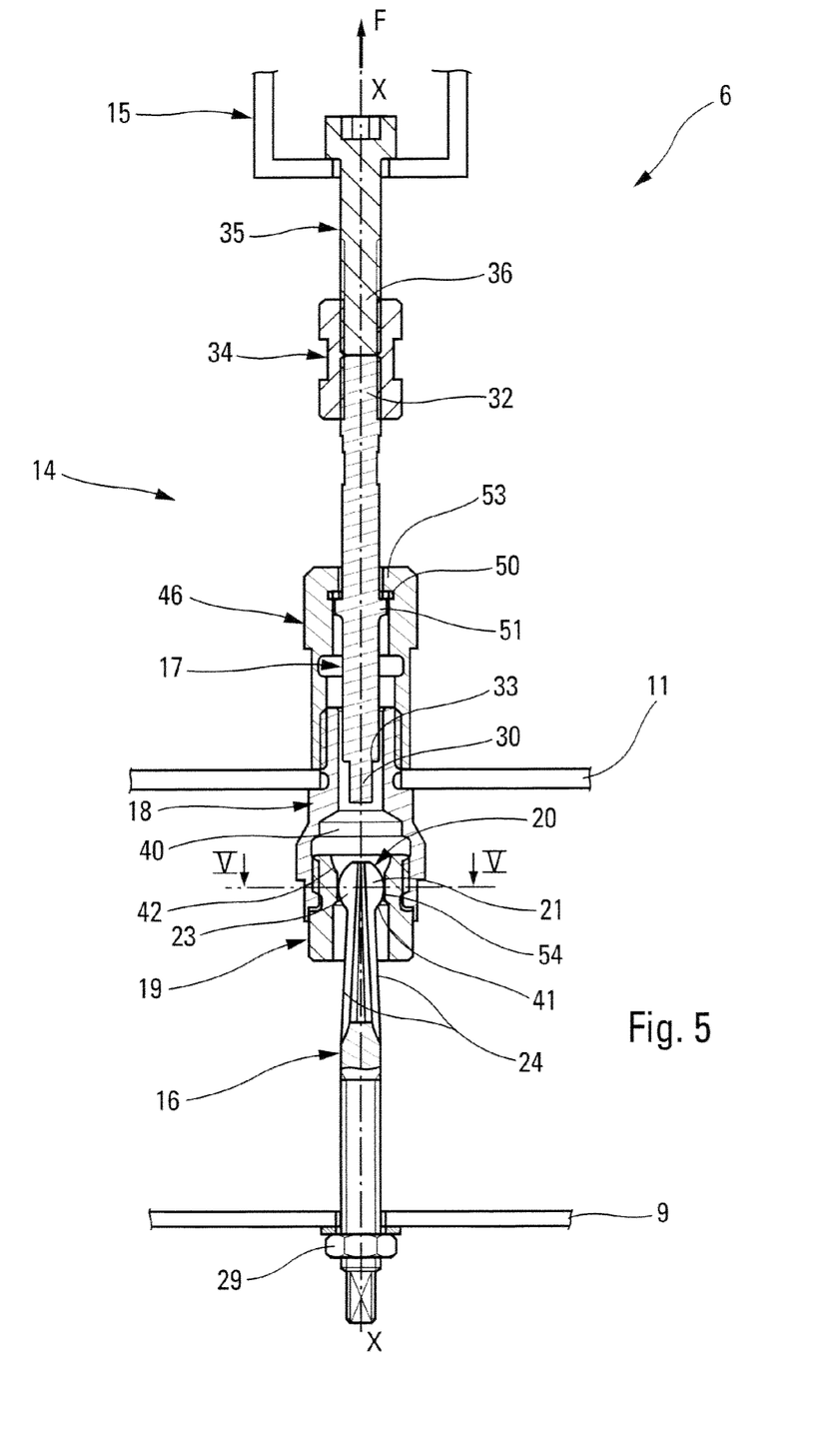

At that time, as shown on FIGS. 5 and 5A, under the action of the spherical bearing 42 of the member 19 moving apart from the rod 16, the elastically deformable fingers 24 progressively radially converge one to the other, in the direction of the axis X-X until they touch each other when the wall 54 defining the axial hole 41 of the annular abutment member 19 reaches the spherical head 22 of said rod. The latter then occupies the closed position. The detachment is then achieved.

Figure 6:
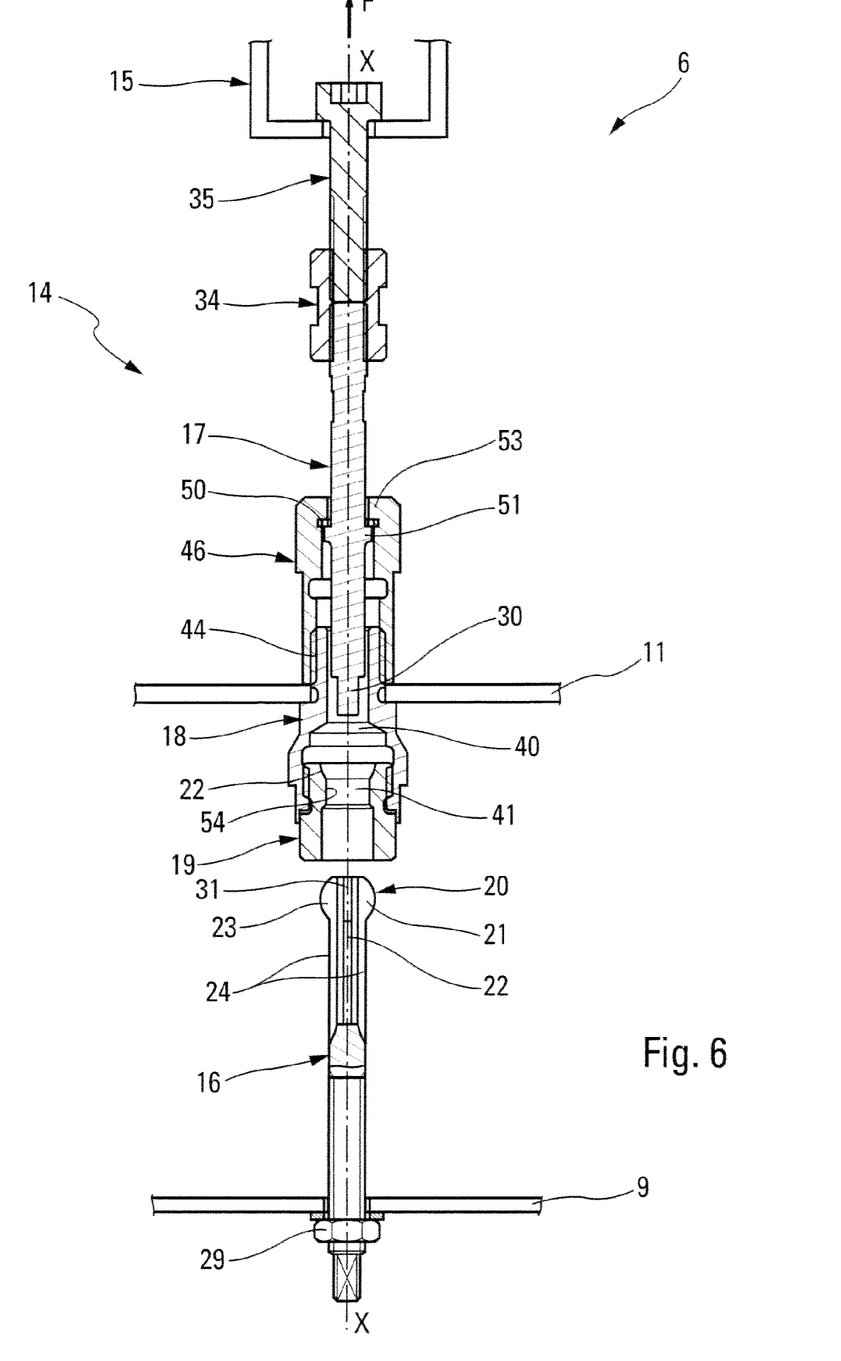

The movement of the control device continues according to the arrow F until the complete detachment represented on FIG. 6, between the floating support 11 carrying, in addition to the equipment 12, the above mentioned assembly of the linking mechanism 14, and the plate 9 on which the rod 16 is fastened, with the head thereof having elastically returned to its initial open position.

As already been reported, such a detachable linking system 6 could find applications in a lot of other fields. Such dimensions and shapes could adapt to any material type requiring decoupling. Moreover, no particular maintenance (greasing, replacement, etc.) is to be provided and the reliability thereof is that of a completely mechanical system without any electrical/electronic control. Furthermore, after being positioned, it is possible to dismantle and then to assemble the system again.

The invention claimed is:

1. A detachable linking system comprising:
a base;
an acceleration system;
a guidance system interacting with the acceleration system;
a linking mechanism linking the base and the acceleration system, comprising:
a control device;
a rod having a widened end being slit longitudinally and elastically deformable and fastened, at its other end, to one of said base or acceleration system;
a needle, movable axially, having an end being introduced into said slit of said widened end of the rod for holding the slit at the widened end in an open position and the other end being connected, directly or indirectly, to said control device;
an annular elongated body comprising an axial hole fastened to the other one of said base or acceleration system and surrounding said widened end of said rod and said end of said needle;
said annular elongated body being axially linked to the needle and comprising, in said axial hole, an annular axial abutment member comprising a bore against which said widened end of said rod is applied;
a deformable ring comprising an outside diameter and an inside diameter defining a ring surface therebetween positioned adjacent a shoulder linked to said annular elongated body having a bore, said ring having a first configuration in which said ring surface abuts the shoulder linked to said annular elongated body and a second configuration in which said outside diameter is deformed and said ring passes through said elongated body bore; and
wherein said control device is axially movable to act on said needle to move said end of said needle away from said widened end of the rod and, through the action of said abutment member linked to said needle, for forcing said elastically deformable widened end to change from its open position to a closed position to enable the widened end of said rod to pass through said bore of said abutment member of the body.

2. The system according to claim 1, wherein said widened end of said rod has the shape of a longitudinally slit spherical head.

3. The system according to claim 2, wherein said widened end comprises at least two slits arranged in perpendicular longitudinal planes separating said spherical head into four elastically deformable identical quarters, at the centre of which the corresponding end of said needle can be introduced so as to hold the widened end in an initial open position.

4. The system according to claim 3, wherein said slits extend into the rod beyond the widened end.

5. The system according to claim 1, wherein said axial abutment member of the body defines a spherical annular bearing in abutting contact with the widened end.

6. The system according to claim 1, wherein said widened end of said rod has a longitudinally slit conical shape.

7. The system according to claim 1, wherein said axial abutment member is arranged on an annular member mounted around said rod and fastened through screwing on said body.

8. The system according to claim 1, wherein fastening said rod to the corresponding base or acceleration system occurs through screwing, the end opposed to the widened end being threaded and crossing a hole provided in said base or acceleration system, and a clamping nut providing the fastening of said rod.

9. The system according to claim 1, wherein linking said needle to said control device comprises a fastening nut receiving a threaded end of the needle, opposite the one introduced in said rod, and a screw of said device.

10. A detachable linking system comprising:
a base;
an acceleration system;
a guidance system interacting with the acceleration system;
a linking mechanism comprising:
a rod having a widened end comprising one or more longitudinal slits and fastened at its other end to one of said base or acceleration system;
a needle having an end being introduced into said one or more longitudinal slits of said widened end of the rod for holding the one or more longitudinal slits of said widened end in an open position and the other end being connected, directly or indirectly, to a control device;

an annular elongated body comprising an axial hole fastened to the other one of said base or acceleration system and comprising an annular axial abutment member positioned in said axial hole and engaging a shoulder within said axial hole, said annular axial abutment member comprising a tapered bore entrance against which said widened end of said rod is applied; and a deformable ring comprising an outside diameter and an inside diameter defining a ring surface therebetween positioned adjacent a shoulder linked to said annular elongated body having a bore, said ring having a first configuration in which said ring surface abuts the shoulder linked to said annular elongated body and a second configuration in which said outside diameter is deformed and said ring passes through said elongated body bore; and wherein said control device, which is linked to an acceleration and rocking system with an ignition source, is axially movable to act on said needle to move said end of said needle away from said widened end of the rod and, through the action of said abutment member linked to said needle, for forcing said widened end to change from its open position to a closed position to enable the widened end of said rod to pass through said bore of said abutment member of the body to separate from said annular elongated body.

11. The system according to claim 10, wherein said widened end of said rod has a spherical head shape.

12. The system according to claim 10, wherein said axial abutment member of the annular elongated body defines a spherical annular bearing in abutting contact with the widened end.

13. The system according to claim 12, wherein said widened end comprises two slits arranged in perpendicular longitudinal planes separating said spherical head into four elastically deformable identical quarters, at the centre of which the other end of said needle can be introduced so as to hold the widened end in an initial open position.

14. The system according to claim 13, wherein said slits extend into the rod beyond the widened end.

15. The system according to claim 10, wherein said widened end of said rod has a longitudinally slit conical shape.

16. A method for forming a detachable linking system comprising:

providing a rod having a first end comprising a widened end being longitudinally slit and a second end opposite the first end, said widened end being elastically deformable to change from an open position to a closed position;

fastening said second end of said rod to one of a base or an acceleration system;

introducing a first end of a needle into said widened end of the rod for holding the longitudinally slit of the widened end in the open position;

connecting a second end of said needle to a control device such that movement of said control device moves said second end;

providing an annular elongated body comprising an axial hole with an annular axial abutment member comprising a bore in said axial hole;

fastening said annular elongated body to the other one of said base or acceleration system;

applying said widened end of said rod against said annular axial abutment member;

providing a deformable ring comprising an outside diameter and a ring surface adjacent a shoulder linked to said annular elongated body having a bore, said permanently deformable ring having a first configuration in which said ring surface abuts the shoulder linked to said annular elongated body and a second configuration in which said outside diameter is deformed and said ring passes through said elongated body bore; and moving said control device away from said rod to act on said needle to move said first end of said needle away from said widened end of the rod and to force said deformable ring from said first configuration to said second configuration and force said widened end to change from its open position to its closed position to enable the widened end of said rod to pass through said bore of said abutment member of the body.

17. The method of claim 16, wherein the annular elongated body is provided in two pieces and the two pieces are attached after the ring has been positioned.

18. The method of claim 16, wherein the rod is fastened to one of the base or acceleration system with a locking nut.

19. The method of claim 16, wherein the needle is connected to a threaded rod, which is connected to the control device.

20. The method of claim 16, wherein the needle is indirectly connected to the control device.

* * * * *